United States Patent [19]

Kato et al.

[11] Patent Number: 4,993,510

[45] Date of Patent: Feb. 19, 1991

[54] MOBILE SPEAKER FIXING DEVICE

[75] Inventors: Toshifumi Kato, Yamagata; Yoshihiro Hirano, Tokyo, both of Japan

[73] Assignee: Pioneer Electronic Corporation, Tokyo, Japan

[21] Appl. No.: 476,221

[22] Filed: Feb. 7, 1990

[30] Foreign Application Priority Data

Apr. 22, 1989 [JP] Japan .............................. 1-48166[U]

[51] Int. Cl.⁵ .............................................. H05K 5/00
[52] U.S. Cl. ..................................... 181/141; 181/144; 181/150; 181/199; 381/86; 381/188; 381/205
[58] Field of Search ............... 181/141, 150, 199, 144; 381/86, 188, 205

[56] References Cited

U.S. PATENT DOCUMENTS 3,993,345 11/1976 Croup .............................. 181/150 X
4,143,249 3/1979 Cinquino .......................... 381/86 X
4,502,149 2/1985 Gefvert .............................. 381/86 X Primary Examiner—Benjamin R. Fuller
Attorney, Agent, or Firm—Sughrue, Mion, Zinn, Macpeak & Seas

[57] ABSTRACT

A speaker grille is arranged to have screw seats projected toward a mount opening in a rear parcel tray of a vehicle, and a skirt portion for contacting a surface of the rear parcel tray at a predetermined distance spaced from the mount opening. A holder plate has a fitting projection portion for fitting in the mount opening, a flange portion projecting from the fitting projection portion to be substantially wider than the mount openings so that the flange portion will abut and support a lower surface of the rear parcel tray. The holder plate is screwed to the speaker grille such that the rear parcel tray is clamped between, and supported by, the skirt portion and flange portion.

7 Claims, 2 Drawing Sheets

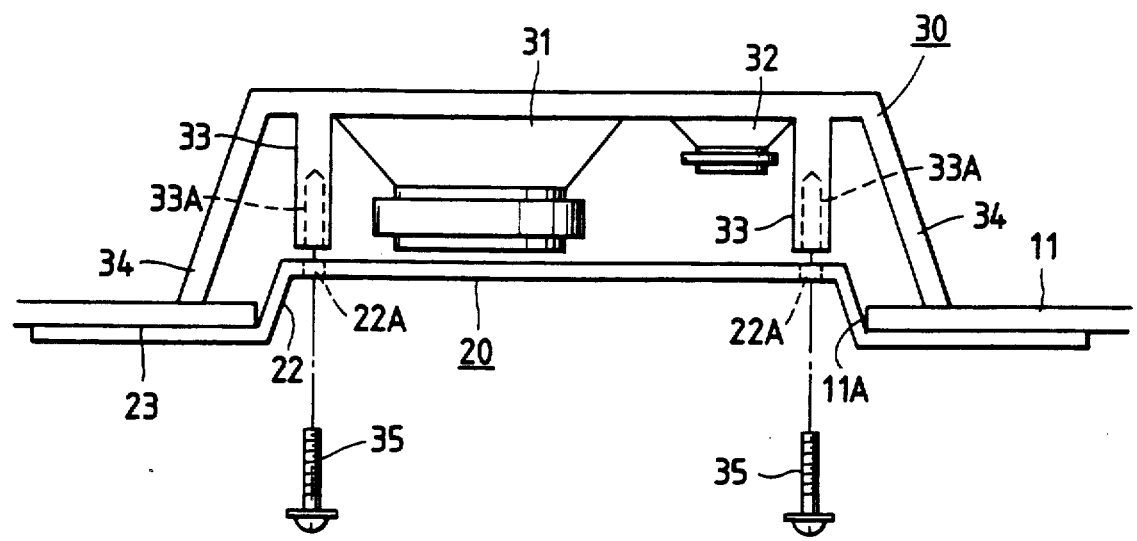
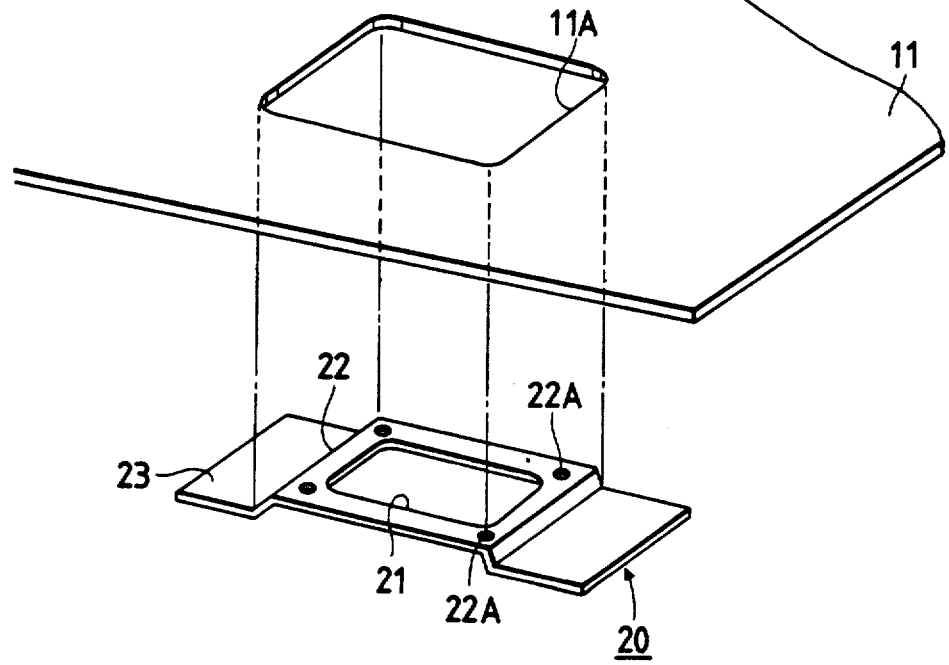

MOBILE SPEAKER FIXING DEVICE

FIELD OF THE INVENTION

The present invention relates to mobile speaker fixing devices, and particularly relates to a fixing device for fixing a mobile speaker in a buried position, onto a rear parcel tray (hereinafter simply referred to as "parcel tray") of a passenger car.

BACKGROUND OF THE INVENTION

The methods or forms of fixing mobile speakers to parcel trays are roughly grouped into an installed form and a buried form. In the buried form, as shown in FIG. 3, a mount opening 2 is formed in a tray board 1, a reinforcing ring 2A is fitted on the peripheral edge of the mount opening 2, fixing screws 4 are screwed from above the grille of a speaker unit 3 into female screw holes formed in the reinforcing ring 2A, and a speaker coil drive unit and the like are received under the tray board 1. Thus, the speaker unit 3 is fixed to the tray board 1, and, accordingly, only the grille fixed to the speaker frame is projected up from the surface of the parcel tray.

In addition to the above, another fixing form has been known (FIG. 4) in which a speaker unit 3 is not directly fixed to a tray board 1 but is fastened with a bolt 8, through brackets 6 and 7, to a frame board 5 constituting a car body on which the tray board 1 is mounted.

In the buried approach discussed above with respect to FIG. 3, the parcel tray bears the whole weight of the speaker unit, so that the parcel tray, having low mechanical strength, deforms with time aging to make it impossible to expect or depend upon the baffle effect which is required for a speaker system.

In the latter fixing device discussed with reference to FIG. 4, there is a problem in that the speaker unit 3 is drawn toward the metal frame board 5 by fastening the bolt, so that the parcel tray is sunk down via mechanical deformation and transformed, thereby to make it impossible to expect a sufficient baffle effect.

SUMMARY OF THE INVENTION

It is therefore an object of the present invention to provide a mobile speaker fixing device which has a simple structure, and which is not transformed at its base, thereby to obtain a sufficient baffle effect.

In order to attain the objects as described above, according to the present invention, the mobile speaker fixing device for fixing a mobile speaker onto a rear parcel tray by burying the speaker in the rear parcel tray is characterized in that: a grille of a speaker has female screw holes to which fixing screws are to be screwed and which are formed on a back side of the grille along a mount opening formed on the rear parcel tray; a holder of a speaker unit has a peripheral edge portion larger than the mount opening of the rear parcel tray, and has a fitting projection portion formed at the inside of the peripheral edge portion so as to be fitted in the mount opening the fitting projection portion having holes formed therethrough so that the fixing screws are inserted through the holes; and wherein the parcel tray board is held between the holder peripheral edge portion and the speaker grille peripheral edge portion so as to fix the mobile speaker.

For assembly, the peripheral edge portion of the holder is positioned on the back surface of the parcel tray, the parcel tray is sandwiched between the peripheral edge portion of the holder and flange portions of the grille of the speaker unit, and the fixing screws are screwed from the holder side toward the grille, so that the speaker units, the parcel tray, and the holder are integrally combined with each other.

BRIEF DESCRIPTION OF THE DRAWINGS

FIG. 1 is a sectional view of the mobile speaker fixing device according to the present invention;

FIG. 2 is an exploded perspective view showing the arrangement of a metal holder with respect to a parcel tray.

BRIEF DISCUSSION OF THE PREFERRED EMBODIMENT OF THE INVENTION

Figure 3:
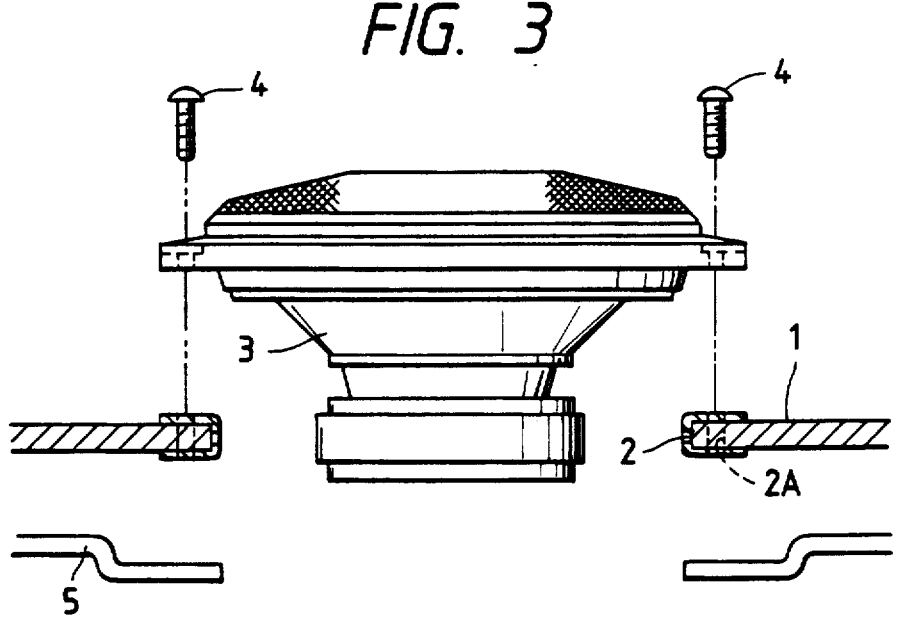
FIGS. 3 and 4 are sectional views showing other speaker mounting approaches.
Figure 4:
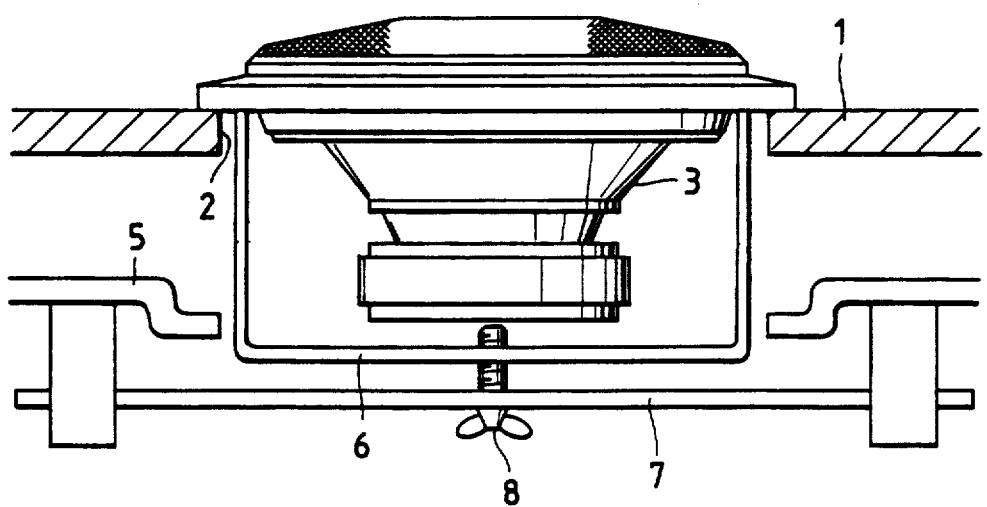

Referring to FIGS. 1 and 2 of the drawings, an embodiment of the mobile speaker fixing device according to the present invention will be described hereunder. In the drawings, the reference numeral 11 designates a parcel tray disposed in the vicinity of a rear window of a passenger car. A speaker-unit mount opening 11A is formed through the parcel tray 11.

A metal holder 20 is prepared for the parcel tray 11. The holder 20 has a mount opening 21 typically centered in the mount opening 11A. The periphery of the mount opening 21 is formed to be a fitting projection 22 which can be fixedly fitted into the mount opening 11A, and holes 22A are formed through the fitting projection 22 so as to correspond to the position and number of female screw holes 33A associated with a speaker grille 30. A portion of the fitting projection 22 is provided (e.q., at two sides) with flange portions 23 which are arranged to abut on the back surface of the parcel tray 11.

Further, speaker units 31 and 32 are attached to the inner surface of a vessel-type speaker grille 30. Screw seats 33 are projectingly provided on the grille outside an area where the two speaker units are attached so as to extend toward the mount opening 11A. Female screw holes 33A are formed in the screw seats 33, respectively. A skirt portion 34 is formed around the periphery of the grille 30 so as to maintain the interval or spacing between the grille 30 and the parcel tray 11, and to enclose the inside of the grille 30 in cooperation with the parcel tray 11. The end surface of the skirt portion 34 is made to come into contact with a surface of the parcel tray 11, which is spaced from the edge of the mount opening 11A of the parcel tray 11.

Fixing is performed in such a manner that fixing screws 35 are screwed through the holes 22A of the holder 20, into the female screw holes 33A of the screw seats 33, so that the grille 30, the holder 20, and the parcel tray 11 are integrally combined with each other, and the edge of the mount opening 11A of the parcel tray 11 is held between the flange portions 23 of the holder 20 and the end surface of the skirt portion 34 of the grille 30.

At that time, although the grille 30 is drawn by the fixing screws 35, the parcel tray 11 is never mechanically deformed to a substantial degree because the flange portions 23 of the holder 20 is made of metal and has a high rigidity which is exerted to support the back surface of the parcel tray 11.

As apparent from the above description, the mobile speaker fixing device according to the present invention is arranged in such a manner that the metallic holder is made to abut the back surface of the parcel tray, the grille having the speaker units thereon is provided on the parcel tray, and the grille and the holder are fixed with the screws, so that the parcel tray can be held between the holder and the grille thereby to be prevented from substantial mechanical deformation. Thus, a speaker fixing device or approach having a baffle effect can be obtained.

What is claimed is:

1. A speaker fixing device for fixing a speaker with respect to a mount opening in a rear parcel tray of a vehicle, said device comprising:

speaker grille means for protecting a speaker and having screw seat means projected toward said mounted opening for receiving fixing screws, and further having skirt means for contacting a surface of said rear parcel tray at a predetermined distance spaced from said mount opening;

holder means having a fitting projection portion for fitting in said mount opening, flange means projecting from said fitting projection portion to be substantially wider than said mount opening so that said flange means can abut and support a lower surface of said rear parcel tray, and fixing screw-mounting means for allowing fixing of fixing screws through said holder means and into said screw seat means;

wherein said holder means can be fixed to said speaker grille means such that said rear parcel tray is clamped between, and supported by said skirt means and said flange means.

2. A device as claimed in claim 1, wherein said screw seat means are arranged within an area of said mounting opening.

3. A device as claimed in claim 2, wherein said skirt means in contact with said surface of said rear parcel tray forms an enclosed volume for containing said speaker therein.

4. A device as claimed in claim 3, wherein said enclosed volume is an enclosed baffle volume.

5. A device as claimed in claim 3, wherein at least one of said skirt means and said screw seat means supports said speaker a predetermined distance from a surface of said rear parcel tray.

6. A device as claimed in claim 2, wherein said fixing screw mounting means are in the form of holes through said holder means.

7. A device as claimed in claim 2, wherein said holes are arranged to align with said screw seat means.

* * * * *